(12) United States Patent
Kim et al.

(10) Patent No.: US 8,386,224 B2
(45) Date of Patent: Feb. 26, 2013

(54) METHOD FOR SIMULATING STRETCHING AND WIGGLING LIQUIDS

(76) Inventors: Doyub Kim, Seoul (KR); Oh-Young Song, Seoul (KR); Hyeong-Seok Ko, Seoul (KR)

(*) Notice: Subject to any disclaimer, the term of this patent is extended or adjusted under 35 U.S.C. 154(b) by 425 days.

(21) Appl. No.: 12/614,295

(22) Filed: Nov. 6, 2009

(65) Prior Publication Data

US 2011/0112800 A1     May 12, 2011

(51) Int. Cl.
*G06G 7/50* (2006.01)
(52) U.S. Cl. ................. 703/9; 703/2; 345/418; 345/474
(58) Field of Classification Search .................. 703/1, 2, 703/6, 9; 345/418, 419, 473, 474
See application file for complete search history.

(56) References Cited

U.S. PATENT DOCUMENTS

| | | | |
|---|---|---|---|
| 7,479,963 B2 * | 1/2009 | Lischinski et al. | 345/474 |
| 7,565,276 B2 * | 7/2009 | Song et al. | 703/2 |
| 7,647,214 B2 * | 1/2010 | Song et al. | 703/2 |
| 8,055,490 B2 * | 11/2011 | Kim et al. | 703/9 |

OTHER PUBLICATIONS

Chang et al, Particle Importance Based Fluid Simulation, IEEE 6th International Conference on Computer Graphics, Imaging and Visualization, Aug. 2009, pp. 38-43.*

* cited by examiner

*Primary Examiner* — Russell Frejd
(74) *Attorney, Agent, or Firm* — John K. Park; Park Law Firm

(57) ABSTRACT

A method for simulating the stretching and wiggling of liquids is provided. The complex phase-interface dynamics is effectively simulated by introducing the Eulerian vortex sheet method, which focuses on the vorticity at the interface and is extended to provide user control for the production of visual effects. The generated fluid flow creates complex surface details, such as thin and wiggling fluid sheets. To capture such high-frequency features efficiently, a denser grid is used for surface tracking in addition to coarser simulation grid. A filter, called the liquid-biased filter, is used to downsample the surface in the high-resolution grid into the coarse grid without unrealistic volume loss resulting from aliasing error.

24 Claims, 3 Drawing Sheets

METHOD FOR SIMULATING STRETCHING AND WIGGLING LIQUIDS

BACKGROUND OF THE INVENTION

The present invention relates to a method for stretching and wiggling liquids. More particularly, this invention relates to a method for stretching and wiggling liquids, which uses an Eulerian vortex sheet method and a liquid-biased filtering.

SUMMARY OF THE INVENTION

The present invention contrives to solve disadvantages of the prior art.

An objective of the invention is to provide a method for stretching and wiggling liquids.

An aspect of the invention provides a method for graphically simulating stretching and wiggling liquids, the method comprising steps for:

modeling multiphase materials with a grid of nodes for dealing with the multiphase behaviors including complex phase-interface dynamics; and simulating stretching and wiggling liquids using an Eulerian vortex sheet method, which focuses on vorticity at interface and provides a user control for producing visual effects and employing a dense (high-resolution) grid for surface tracking in addition to a coarse (low-resolution) simulation grid, which downsamples a surface in the high-resolution grid into the low-resolution grid without a volume loss resulting from aliasing error, and the step of employing the dense grid for surface tracking is performed by a liquid-biased filtering, in which liquid regions of the coarse grid enclose all liquid regions of the dense grid by simply shifting the level set threshold value.

The step of modeling multiphase materials may comprise steps of:

describing liquid and gas with a set of nonlinear partial differential equations that describe the complex-phase interface dynamics;

representing the liquid-gas interface as an implicit surface; and determining properties of the materials, from the information about the liquid-gas interface, including tracking the liquid surfaces.

The set of nonlinear partial differential equations may comprise an incompressible Euler equation given by a momentum conservation equation for inviscid incompressible free-surface flow $$u_t + (u \cdot \nabla)u + \nabla p = f,$$

and a mass conservation equation $$\nabla \cdot u = 0,$$

and u denotes the velocity field of the fluid, p pressure, and f represents the external forces including gravity and vorticity confinement force.

The step of representing the liquid-gas interface may comprise a level set method.

The level set method may comprise a level set equation, $\phi$, an implicit signed distance function such that $|\nabla \phi| = 1$ for all domains.

The surface of liquid may be obtained by tracking the locations for $\phi = 0$.

The liquid may evolve dynamically in space and time according to the underlying fluid velocity field, u, and the level set function may change according to the dynamical evolution of liquid and is updated by the level set equation, $\phi_t + u \cdot \nabla \phi = 0$.

The method may further comprise the step of solving the incompressible Euler equations and the level set equation at each time step.

The step of solving the incompressible Euler equations and the level set equation may comprise steps of:

advecting the level set according to the level set equation;

updating the velocity by solving the incompressible Euler equations; and simulating stretching and wiggling liquids, wherein the level set function $\phi$ and the fluid velocity field u are updated.

The step of updating the velocity may comprise a step of solving the momentum conservation equation and the mass conservation equation using a fractional step method, in which a Poisson equation is solved under divergence-free conditions to obtain a pressure, which is then used to project the intermediate velocity field into a divergence-free field.

The step of solving the incompressible Euler equations and the level set equation may comprise steps of:

using a free-surface model in which atmospheric pressure is assumed to be constant, $p|_{\phi>0} = p_{atm}$ as a Dirichlet condition boundary condition at the liquid-air interface; and using a ghost fluid method for solving free-surface flow, and the free-surface flow model does not simulate a fluid flow of air and a velocity at the interface is extrapolated to the air region along a direction normal to a liquid surface.

The Eulerian vortex sheet method may assume that vorticity $\omega = \nabla \times u$ is concentrated at the liquid—air interface, wherein the phase interface itself constitutes a vortex sheet with varying vortex sheet strength, wherein for the three-dimensional case, vortex sheet strength $\eta$ is approximated at a interface $\Gamma$ by $$\eta = n \times (u^+ - u^-)|_\Gamma,$$

where $u^\pm$ is the velocity at $\phi^\pm$, wherein $\eta$ is a three-dimensional vector quantity, implying that the vortex sheet strength is a jump condition for the tangential component of the velocity across the interface.

Combining the vortex sheet strength equation with the Euler equations, the transport of the vortex sheet may be expressed as $$\eta_t + u \cdot \nabla \eta = -n \times \{(\eta \times n) \cdot \nabla u\} + n\{(\nabla u \cdot n) \cdot \eta\} + S.$$

The left-hand side of the transport equation may be related to the advection of the vortex sheet strength $\eta$, and the terms in the right-hand side represent the effects of stretching, dilatation, and extra sources, and the transport equation may be valid only at the interface since $\eta$ is defined on the surface, and in the vicinity of the surface, $\eta$ is extrapolated along the surface normal direction using $\nabla \eta \cdot \nabla \phi = 0$, an Eikonal equation.

A source term S may comprise surface tension and baroclinity terms, and the baroclinity term accounts for interfacial effects including the Rayleigh-Taylor instability, which arise due to the density difference between liquid and air.

The source term may be $S = bAn \times (a-g)$, where b is a parameter used to control the magnitude of this effect.

Solving the transport equation may give the vortex sheet strength $\eta$ over the liquid surface.

The vorticity $\omega$ may be calculated from $\eta$ with $$\omega(x) = \int_\Gamma \eta(s) \delta(x - x(s)) ds.$$

The vorticity equation may be rewritten as a volume integral $$\omega(x) = \int_V \eta(x')\delta(x-x')\delta(\phi(x'))|\nabla\phi(x')|\,dx',$$

and the velocity is calculated from the vorticity ω using the stream function $\nabla^2\psi=\omega$, and then compute $u=\nabla\times\psi$.

With the computed vorticity, the vorticity confinement may be applied to the velocity field, wherein letting $N=\nabla|\omega|/|\nabla|\omega||$, the vorticity confinement force can be written as $$f_v(x)=\alpha h(N\times\omega),$$

where h is the size of the grid cell, and α is the control parameter for the vorticity confinement force.

A single time step may be simulated by augmenting the external force term of vorticity confinement force equation with the confinement force, and a semi-Lagrangian scheme may be used for the advection term in the transport equation, and other terms may be discretized with second-order central difference, and first-order Euler integration is used for time-marching, and in implementing the vorticity confinement, the interface-concentrated vorticity ω of the volume integral equation may be blended using a truncated Gaussian kernel with a kernel width of 10h.

In order to generate turbulence effects, η in the volume integral equation may be replaced with $\hat{\eta}=\eta(1+T\Phi)$, where T is the projection operator and Φ is the ambient vector noise, which is generated using the Perlin noise algorithm, and operator T projects this noise to the tangential plane of the surface, since vortex sheet strength should be orthogonal to the surface normal.

The method may further comprise a step of using a plruality of control variables comprising b, α, and Φ, in order to control the extent of liquid-air interaction, the strength of the vortices, and the ambient noise, respectively.

The liquid-biased filtering may be configured not to miss liquid regions in a process of downsampling, making the liquid regions of the coarse grid enclose all the liquid regions of the dense grid by simply shifting the level set threshold value.

The advantages of the present invention are: (1) the method for simulating stretching and wiggling liquids is provided; and (2) the method for simulating stretching and wiggling liquids allows effective simulation using a free-surface model and a liquid-based filter.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

1. Introduction

Figure 1:
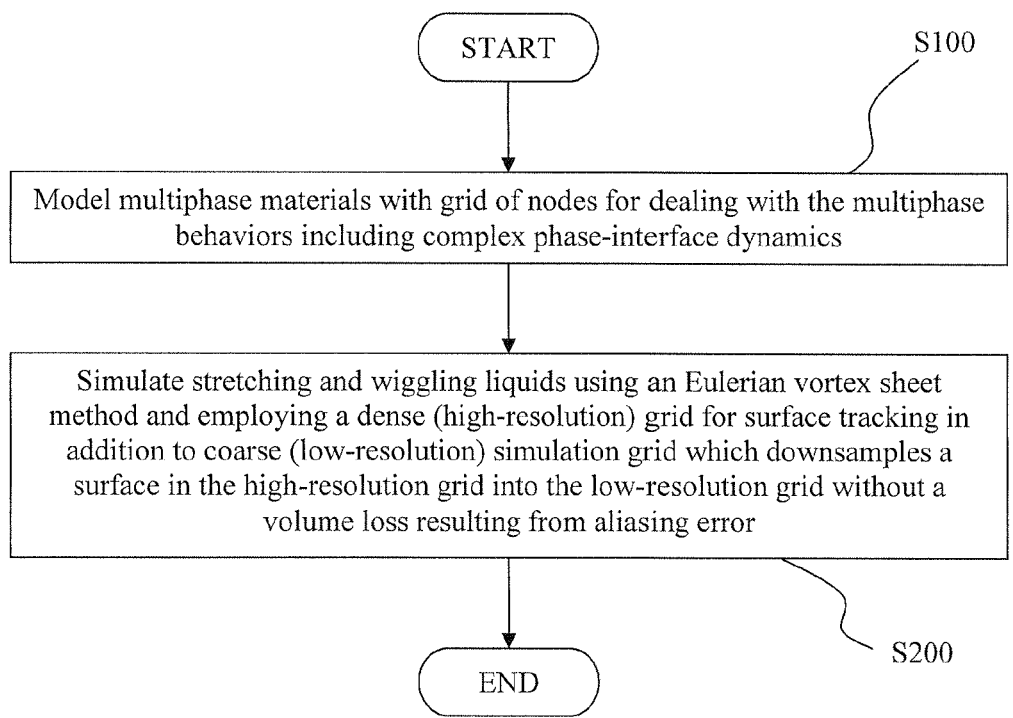
FIG. 1 is a flowchart illustrating a method for simulating stretching and wiggling liquids according to an embodiment of the invention.

There are many snapshots on billboards and slow-motion pictures in TV commercials showing volumes of liquid that stretch into a sheet, wiggle, and then break into droplets. This beautiful, complex phenomenon results from liquid—air interfacial effects such as force instabilities, and other inter-medium interactions. The invention is concerned with reproducing such phenomena in the context of visual effects. To this end, the invention adopts physically-based approaches, but aims to develop a controllable, viable method.

Physics-based simulation of three-dimensional liquids essentially samples physical quantities using discrete grids [6, 4], particles [19, 22], or a hybrid of both [27, 16]. While the above solvers produce plausible results when they are applied to large bodies of liquid (compared to the grid size and/or inter-particle distance), they often produce overly damped or dissipated results when they are used to generate wiggling/tearing of liquid sheets. This limitation can be alleviated by tailoring the solvers such that liquid—air interfacial effects are accounted for through dynamic simulation and capturing of the resulting surface to a satisfactory extent.

In this specification, a novel method for simulating liquid-air interfacial effects is proposed. The method consists of two major components: (1) a controllable Eulerian vortex sheet model, and (2) a liquid-biased filter. The Eulerian vortex sheet model of Herrmann [2003; 2005] focuses on the interface (rather than the whole volume) in the simulation of complex interface dynamics. This model is extended so that the vortex around the liquid surface can be controlled as desired. With the above method, detailed fluid motion around the liquid surface can be generated without expensive computational cost. Also, when the wiggling and stretching feature of the liquid surface appears which contains high-frequency modes, denser mesh should be applied according to the Nyquist limit. However, denser meshing implies higher cost, especially for solving linear system during the computation of incompressible flow. This work uses denser grids only for the purpose of capturing interfacial surfaces, in addition to the (coarser) simulation grids. In this setup, a new filter that shows superior capturing performance for thin liquid volumes is developed, so that unrealistic aliasing error can be removed.

2. Related Work

The stable fluids framework introduced by Stam [1999] is an important innovation in the field of fluid animation. The implicit pressure projection and semi-Lagrangian advection used in this framework enable us to take large time-steps without blowing up the simulation. Foster and Fedkiw [2001] demonstrated that the stable fluids framework, when combined with the level set method, can be used for liquid animation. In other work, some researchers resorted to multi-phase dynamics for liquid animation [28, 9, 15].

Realism has been a constant issue in fluid simulation. Noting that vorticity is an important element in realistic fluid movements, Fedkiw et al. [2001] introduced the vorticity confinement method, which detects and explicitly models the curly components in fluid flows. Selle et al. [2005] reproduced turbulent smoke/liquid movements by introducing the vortex particle method. A procedural approach (called curl noise) to generate vorticity was proposed by Bridson et al. [2007]. Recently, several turbulence-based methods have been presented to resolve sub-cell vorticities [13, 23, 20]. Accurate advection is critical for realistic fluid simulation. Several high-order advection schemes also have been proposed, including the back and forth error compensation and correction (BFECC) method [11], MacCormak scheme [24], and constrained interpolation profile (CIP) methods [28, 12].

In the simulation of a liquid, surface tracking performance is another major factor in obtaining realistic results. After the introduction of the level set method by Foster and Fedkiw [2001], Enright et al. [2002] proposed the particle level set method to improve the surface tracking accuracy. The particle level set method was extended to derivative particles [27] and the marker level set [18]. Surface tracking quality can also be enhanced by using grids of higher resolution; this idea formed the basis for various adaptive data structures, including the octree [14], semi-Lagrangian contouring [1], lattice-based tetrahedral meshes [2], and the hierarchical RLE grid [10].

In addition to the above grid-based methods, particle-based fluid solvers have also been actively studied. Müller et al. [2003] introduced smoothed particles hydrodynamics (SPH), and Premože et al. [2003] introduced the moving particles semi-implicit method (MPS) to the graphics community. Zhu and Bridson [2005] introduced the fluid implicit particle (FLIP) method to reduce numerical dissipation of a grid-based advection solver. Recently, Adams et al. [2007] presented the adaptive SPH method, and Solenthaler and Pajarola [2009] introduced Predictive-Corrective Incompressible SPH scheme to increase the stability of the particle solver. To exploit the advantages of both grid-based and particle-based methods, Lossaso et al. [2008] and Hong et al. [2008] coupled the level set and SPH frameworks.

3. Basic Fluid Solver

The method according to the invention is based on the stable fluids solver and the level set method. This section briefly describes this basic solver and lists the equations that form the groundwork for deriving the proposed method.

3.1 Level Set Method

The level set method is a popular technique for tracking liquid surfaces. Level set $\phi$ is a signed-distance function such that $|\nabla\phi|=1$ for all domains and the interface is defined at $\phi=0$. Due to this property, the surface normal $n=\nabla\phi/|\nabla\phi|$, and mean curvature $\kappa=\nabla\cdot n$ can be easily obtained In the level set framework, a surface integral can be transformed to a volume integral with $$\int_\Gamma f(s)ds = \int_V f(x')\delta(\phi(x'))|\nabla\phi(x')|dx', \quad (1)$$

where $\delta$ is the smeared delta function $$\delta(x) = \begin{cases} \frac{1}{2e} + \frac{1}{2e}\cos\left(\frac{\pi x}{e}\right) & \text{if } |x| \le e \\ 0 & \text{if } |x| > e. \end{cases} \quad (2)$$

A certain quantity $\psi$ extrapolated along the direction normal to the liquid surface can be generated by imposing the condition [6]

$$\nabla\psi\cdot\nabla\phi=0, \quad (3)$$

which is one of the Eikonal equations and can be solved efficiently using the fast marching method (FMM) [26].

Now let's exlain how to evolve the interfacial surface under the flow field. When the velocity field is given by u, the level set field can be updated by solving $$\phi_t+u\cdot\nabla\phi=0. \quad (4)$$

The above level set advection equation can be solved using the semi-Lagrangian method [29, 6]. Since numerical diffusion can cause a significant loss of mass, in this work the particle level set method (PLS) of Enright et al. enright:2002: AAR is used. After evolving the surface, FMM was performed once again to ensure the signed-distance property.

3.2 Incompressible Flow

In this specification, inviscid incompressible free-surface flow is assumed when modeling the liquid dynamics. Incompressible Euler equations are given by the momentum conservation equation $$u_t+(u\cdot\nabla)u+\nabla p=f \quad (5)$$

and the mass conservation equation $$\nabla\cdot u=0, \quad (6)$$

where u and p represent the velocity and pressure, respectively. The term f represents external forces, such as gravity or the vorticity confinement force [5]. The above equations are solved using the fractional step method of Stam stam:1999: SF, in which a Poisson equation is solved under divergence-free conditions to obtain the pressure, which is then used to project the intermediate velocity field into a divergence-free field.

For simulating the liquid, a free-surface model in which atmospheric pressure is assumed to be constant ($p|_{\phi>0}=p_{atm}$) is used. This condition is reflected in the simulator as a Dirichlet boundary condition at the liquid—air interface. Under this condition, the free-surface flow is solved using the ghost fluid method [7]. Since the free-surface model does not simulate the fluid flow of air, the velocity at the interface should be extrapolated to the air region using equation (3) [6].

In the following two sections, the two main methods proposed in this specification are described. First, the Eulerian vortex sheet method is introduced and extended to make the technique controllable. Second, a liquid-biased filter is presented in the context of super-sampled surface tracking that is targeted to not missing thin liquid structures.

4. Controllable Eulerian Vortex Sheet Model

As a liquid evolves, motion of the surface is affected by the surrounding air. When a liquid stretches into a thin sheet, this interaction force becomes more dominant and often causes the liquid to wiggle or break into droplets. One approach that could potentially be used to simulate such situations is the multi-phase method, which can reflect the presence of air by assigning jump conditions to the density and viscosity at the air—liquid interface [9]. Except for the surface tension, however, the multi-phase method does not handle the phase interface explicitly. Although the phase-interaction is highly concentrated at the interface, the multi-phase method treats the entire domain uniformly. Only density and viscosity are the related variables, but they are not directly involved in the deformation of the surface. In this context, it is worth considering the Eulerian vortex sheet method, which explicitly focuses on the liquid surface rather than the whole domain.

The vortex sheet method assumes that vorticity $\omega=\nabla\times u$ is concentrated at the liquid—air interface. The phase interface itself constitutes a vortex sheet with varying vortex sheet strength. For the three-dimensional case, vortex sheet strength $\eta$ can be approximated at the interface $\Gamma$ by [8]

$$\eta=n\times(u^+-u^-)|_\Gamma, \quad (7)$$

where $u^\pm$ is the velocity at $\phi^\pm$. Note that $\eta$ is a three-dimensional vector quantity. The above equation implies that the vortex sheet strength is a jump condition for the tangential component of the velocity across the interface. Combining the above equation with the Euler equations, the transport of the vortex sheet can be expressed as $$\eta_t+u\cdot\nabla\eta=-n\times\{(\eta\times n)\cdot\nabla u\}+n\{(\nabla u\cdot n)\cdot\eta\}+S. \quad (8)$$

The derivation and a detailed explanation of this equation can be found in the works of Tryggvason [1988] and Pozrikidis [2000]. Here, the left-hand side of the equation is related to the advection of the vortex sheet strength η, and the terms in the right-hand side represent the effects of stretching, dilatation, and extra sources. This equation is valid only at the interface since η is defined on the surface. However, for numerical simulation, in the vicinity of the surface, η is extrapolated along the surface normal direction using equation (3).

In the original vortex sheet equation of Pozrikidis [2000], S consists of the surface tension and baroclinity terms. Since surface tension is computed more accurately [3], the surface tension is ignored for now. Pozrikidis [2000] uses the baroclinity term $2An\times(a-g)$, where $A=(\rho^- - \rho^+)/(\rho^- + \rho^+)$ is the Atwood number, a is the average convective acceleration at the interface, and $g=-9.8\hat{j}$ is the acceleration due to gravity. The baroclinity term accounts for interfacial effects such as the Rayleigh—Taylor instability [30], which arise due to the density difference between liquid and air. In adopting the vortex sheet method, the following source term is used $$S = bAn\times(a-g), \quad (9)$$

where b is a parameter used to control the magnitude of this effect. The variable b is set to a value between 1 and 2 in this work.

Solving equation (8) gives the vortex sheet strength η over the liquid surface. The following is how to calculate the velocity with this information. First, vorticity ω from η is calculated with $$\omega(x) = \int_\Gamma \eta(s)\delta(x - x(s))ds. \quad (10)$$

The above equation can be rewritten as a volume integral (see equation (1))

$$\omega(x) = \int_V \eta(x')\delta(x-x')\delta(\phi(x'))|\nabla\phi(x')|dx'. \quad (11)$$

The conventional approach to computing the velocity from the vorticity ω is to use the stream function $\nabla^2\psi = \omega$, and then compute $u = \nabla\times\psi$. For controllability, however, the present work employs a local correction method that is similar to the method of Selle et al. [2005].

With the vorticity computed from equation (11), vorticity confinement is applied to the velocity field. Letting $N=\nabla|\omega|/|\nabla|\omega||$, the vorticity confinement force can be written as $$f_v(x) = \alpha h(N\times\omega), \quad (12)$$

where h is the size of the grid cell, and α is the control parameter for the vorticity confinement force. Simulation of a single time step is completed by augmenting the external force term of equation (5) with the confinement force. The semi-Lagrangian scheme is used for the advection term in equation (8). All other terms are discretized with second-order central difference, and first-order Euler integration is used for time-marching. In implementing the vorticity confinement, the interface-concentrated vorticity ω of equation (11) is blended using a truncated Gaussian kernel [25]. A kernel width of 10h is used.

A nice feature of the vortex sheet formulation is that the interface dynamics are explicitly expressed as a source term. Inspired by Herrmann [2003] and Bridson et al. [2007], this feature is exploited to generate turbulence effects. To do so, η in equation (11) is replaced with $\hat{\eta} = \eta(1+T\Phi)$. Here, T is the projection operator and Φ is the ambient vector noise, which is generated using the Perlin noise algorithm [21]. Operator T projects this noise to the tangential plane of the surface, since vortex sheet strength should be orthogonal to the surface normal.

In this section the vortex sheet model is adopted for effective handling of the interfacial dynamics. In the process, several extensions were made for visual effects production. The extended vortex sheet model now has three control variables, namely b, α, and Φ, which can be used to control the extent of liquid—air interaction, the strength of the vortices, and the ambient noise, respectively. The following section describes how to capture the rich details of liquid surface generated by the vortex sheet model efficiently.

5. Surface Tracking with Super-Sampling

Performing surface tracking on a higher-resolution grid can increase visual realism of the simulation without introducing too much extra cost. Goktekin et al. [2004] found that using a higher resolution grid for surface tracking can reduce volume loss significantly. Bargteil et al. [2006] pioneered the use of higher resolution octree grids for surface tracking. Recently, Wojtan and Turk [2008] embedded a high-resolution grid into a coarser grid in finite element method (FEM) simulations, and used the resulting formalism to simulate thin structures of a viscoelastic fluid.

Figure 2:
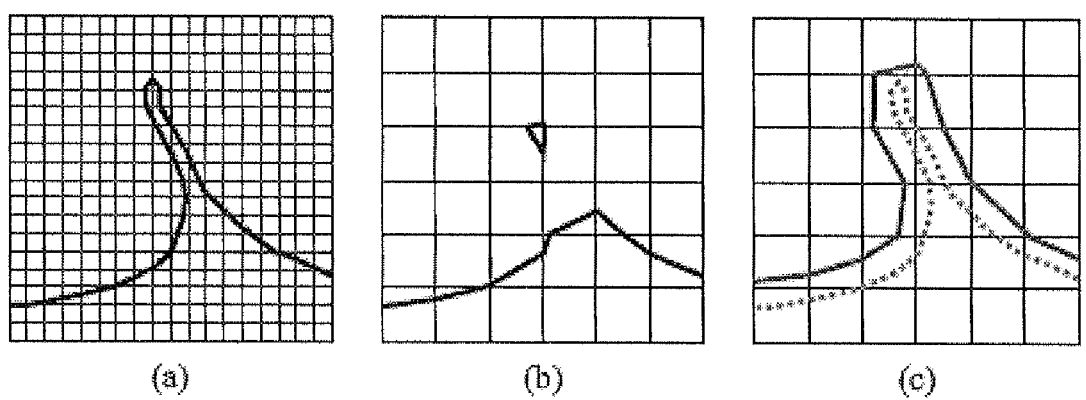
FIGS. 2(a)-(c) are diagrams illustrating aliasing in the simulation grid.

As noted by Lossaso et al. [2004] and Bargteil et al. [2006], however, using a denser grid for surface tracking can lead to artifacts. For example, suppose a thin water structure tracked via a dense grid (FIG. 2(a)). The problem occurs when the simulator tries to solve the projection step for maintaining incompressibility. As shown in FIG. 2(b), the simulation grid cannot resolve such high-frequency signals. The liquid regions that are not captured will vanish because they are no longer incompressible. To resolve the above problems, the liquid-biased filter is presented, which can effectively conserve incompressibility of small liquid fractions.

5.1 Liquid-Biased Filtering

When sampling needs to be done, a filter can be designed to reduce the aliasing error. A sophisticated filtering method is required when downsampling the surface from a dense grid to a coarse grid. Several filters have been proposed for reconstructing implicit surfaces [17]. The immersed boundary approach [28], which uses a smeared delta function as a filter, is also an anti-aliasing method. Although the reconstructed distance value may be accurate in the above methods, however, the sign may be flipped. Therefore, even when using sophisticated downsampling filters, some parts of the liquid volume may still be interpreted as air regions.

In this context, a new filter is designed, which it is called the liquid-biased filter since it is targeted to not missing liquid regions in the process of downsampling. The filter makes the liquid regions of the coarse grid enclose all the liquid regions of the dense grid by simply shifting the level set threshold value. Let us denote the level sets defined on the coarse and dense grids as $\phi_C$ and $\phi_D$, respectively. The liquid surface in the dense grid is defined as the zero-level set $\phi_D=0$. From the definition of the signed-distance function, the region $\phi_D \leq \epsilon$ (where ε is a small positive number) includes the region $\phi_D<0$. ε is defined to be $\epsilon' \cdot h_C$, where $h_C$ is the grid size of the coarse grid. In transferring the liquid surface in the dense grid to the coarse grid, here the incompressible region is taken according to $\phi_C \leq \epsilon$ (the regions enclosed by the solid line in FIG. 2(c)), instead of $\phi_C<0$ (the regions enclosed by the dotted line in FIG. 2(c)). $\epsilon'=0.5$ to capture even the thinnest structures in the dense grid.

To solve free-surface incompressible flow, the ghost fluid method [7] is applied with a Dirichlet boundary condition on the surface given by the atmospheric pressure $p=p_{atm}$. Since the incompressible region is defined as $\phi_C < \epsilon$, the pressure p at $\phi_C = \epsilon$ should be $p_{atm}$. Let us consider solving the one dimensional pressure Poisson equation, where the interface $\phi_C = \epsilon$ is located between grid points i and i+1 (of the coarse grid), and the above Dirichlet boundary condition is applied at that interface. The discretized Poisson equation can be written as, $$\frac{p_{i+1}^G - 2p_i + p_{i-1}}{h_C^2} = \frac{u_{i+1/2} - u_{i-1/2}}{h_C}, \quad (13)$$

where $p_{i+1}^G$ is the ghost pressure value extrapolated from the internal side of the liquid. To obtain $p_{i+1}^G$, linear extrapolation can be performed with $$p_{i+1}^G = \frac{p_{atm} + (\theta - 1)p_i}{\theta}, \quad (14)$$

where $\theta$ is the normalized distance from grid point i to interface $\phi_C = \epsilon$. Substituting equation (14) into (13) produces a linear system that can be solved using the preconditioned conjugate gradient method. The computed pressure contains an error, since the boundary was shifted about $0.5\epsilon$. However, this liquid-biased filtering successfully preserves sub-cell scale liquid fractions.

The effect of the liquid-biased filter against aliasing could be observed in a simulation. In the simulation, liquid sprays are emitted by nozzles and drop into a rectangular container. When the liquid-biased filter is used, the water level rises as expected. Without the liquid-biased filter, however, the water level does not rise because the thin water layer at the bottom of the container is not captured via the coarse simulation grid. During the liquid-biased filtering, however, the downsampled volume is not accumulated over time. Thus, an opposite bias is not applied, and there is no accumulation of volume. In the same context, it is clear that the liquid-biased filtering is different from the thickening method by Chentanez et al. [2007], which adds more thickness where the volume loss occurs.

Due to its Eulerian representation of the surface, the level set method can automatically handle topological changes. Numerical diffusion has a catalytic role in generating the topological changes. When the grid resolution increases, the amount of diffusion decreases, which can lead to prevention of topological changes. In particular, when liquid-biased filtering is used on a high-resolution grid, two adjoining liquid volumes may remain disjoint rather than combining.

To properly handle topological changes, artificial diffusion can be applied to force the liquid to merge. The amount of diffusion should be as small as possible, since it might blur out desirable surface details. Also, the diffusion should be biased to the merging of liquid, since merging of air means deletion of the liquid sheet. To meet these requirements, the level set is simply reinitialized from $\phi_D = d$ (instead of $\phi_D = 0$), where d is a small positive number. Due to the property of the level set, merging takes place if the distance between the liquid volumes is less than 2d. It was found that setting $d=0.1h_C$ gives plausible results. However, parameter d is actually not that sensitive. Value nearby $0.1h_c$ will suffice.

6. Results

All experiments reported in this specification were performed on an Intel Core2 Quad Q6600 2.4 GHz processor with 4 GB of memory without parallel execution. Uniform regular staggered grid was used for the coarse mesh, and an adaptive octree grid for the dense mesh. Every physical quantity except the level set was stored in the coarse grid. In all simulations, the advection step was performed using the first-order semi-Lagrangian method. The particle level set method [4] was used to correct the numerical dissipation error during the level set advection. The simulation used 1:2 for b, 10:50 for $\alpha$, and 0:1 for the magnitude of the noise. In addition, the simulation used $1.5 \times h_C$ for e in equation 2, and 799/801 for A in equation 9. CFL number was restricted to be under 3 for stability.

A simulation of liquid injected toward a statur of Venus generates a complex splah shows the result obtained when the proposed simulator was applied to the reproduction of a liquid interacting with a static solid obstacle. The simulation took about 8 to 120 seconds to advance a single animation frame, depending on the scene complexity. Most of the computational time was spent performing the octree refinement. The simulator successfully reproduced the fine details of liquid sheets and droplets that form as the liquid volume hits the statue.

In another simuation of liquid sprays injected toward a dragon model, a large number of massless particles are emitted from the nozzles, and are soon converted into a grid-based surface by the particle level set method. Due to the vortex sheet model and high-resolution surface tracking grid, complex details of the liquid can be simulated and visualized, even with a relatively coarse simulation grid. About 10 to 30 seconds were required to simulate a single animation frame.

To compare the simulation quality afforded by the proposed method with that achieved using conventional free-surface and multiphase simulations, another experiment was performed in which the various methods were used to simulate a large water ball dropping into a rectangular body of water under gravity. In this experiment, level-set particles were not utilized. The scene was simulated with the proposed method, with the conventional free-surface flow, with a multiphase solver, and with the conventional free-surface flow but with a higher-resolution simulation grid such that the computation time is same. This simulation demonstrates that, compared to the other approaches, the proposed method generates a more realistic result that retains complex details and thin structures.

It is noted that the liquid-biased filter is designed to precisely capture subcell-sized interfaces, not to compensate volume error. However, the liquid-biased filter is helpful in preserving volume. Thin structures like shower stems generate mass losses, and it gains volume slightly more than the input flow, due to the topology handling step. However, compared to the setup without liquid-biased filtering, the solver shows better performance in volume conservation. When volume variation was measured for the water-ball drop experiment, it had +0.56% volume errors between the first frame and the last frame, and +0.67% for the maximum error at $97^{th}$ frame. These small errors were occurred because tangling sheet of of air or isolated bubbles are deleted when topologies was changed.

To simulate micro-scale surface tension effects, surface tension force [9] was applied with geometrical diffusion [31]. Even if the process is not entirely physically-correct, it has been found that the additional diffusion process is quite essential for reducing the artifacts caused by super-sampling method and particle level set correction.

In experiments, high-order schemes were employd, such as BFECC or CIP. It is noted that such decision was not to replace high-order schemes with the proposed method. In fact, if the proposed method had combined with a high-order scheme, it would have produced richer details. What this specification tries to demonstrate is that the proposed method can produce complex liquid scenes without increasing the overall accuracy of the simulation but via an effective use of computation to more important regions (in the production of visual effects) and explicit user control.

Figure 3:
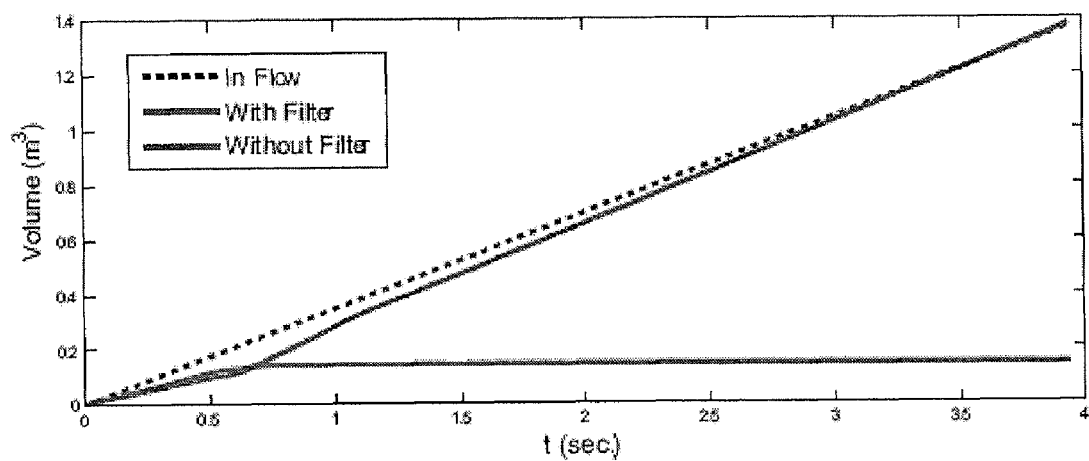
FIG. 3 is a graph illustrating a volume change rates of a shower experiment according to an embodiment of the invention.

In FIG. 3, the volume change rates of the shower experiments. Dashed line, top solid line, and bottom solid line indicates the input flow, experiment with the liquid-biased filter, and experiment without the liquid-biased filter, respectively.

7. Conclusions

In this specification, a novel framework has been presented for simulating complex liquid motion, introduced by phase interface dynamics. It was noted that when thin liquid structures make fast movements in air, the interfacial dynamics becomes a dominant component of the liquid motion. It was demonstrated that complex phase-interface dynamics can be effectively simulated using the free-surface model by introducing the Eulerian vortex sheet method. By making several extensions to the original vortex sheet method, an interfacial dynamics solver capable of reproducing a wide range of liquid scenes with artistic control was devised.

To track the surface under the complex fluid flow, an extra high resolution grid was employed for surface tracking, in addition to the simulation grid. In this setup, the mismatch caused by the downsampling from the dense to the coarse grids could result in aliasing errors. In simulating thin liquid structures, loss of liquid volume is more noticeable than that of air volume. A new filter targeted to this situation, called the liquid-biased filter, was proposed. This filter was able to downsample the surface without unrealistic volume loss.

The method has several limitations. By simulating only water with a free surface boundary, it can cause dissipation of air. For example, air bubbles are easily smeared out inside the water volume, rather than rising to the water surface. This is partially due to the use of the liquid-biased filter which expands the water regions. In situations where accurately capturing both air movement and water dynamics is essential, a multiphase solver [28, 9, 15] could be used as a basic Navier-Stokes solver. The super-sampling model cannot capture very tiny droplets below the super-sampling resolution because it is still based on Eulerian sampling.

As shown in FIG. 1, an aspect of the invention provides a method for graphically simulating stretching and wiggling liquids, the method comprising steps for:

modeling multiphase materials with a grid of nodes for dealing with the multiphase behaviors including complex phase-interface dynamics (S100); and simulating stretching and wiggling liquids using an Eulerian vortex sheet method, which focuses on vorticity at interface and provides a user control for producing visual effects and employing a dense (high-resolution) grid for surface tracking in addition to a coarse (low-resolution) simulation grid, which downsamples a surface in the high-resolution grid into the low-resolution grid without a volume loss resulting from aliasing error (S200), and the step of employing the dense grid for surface tracking is performed by a liquid-biased filtering, in which liquid regions of the coarse grid enclose all liquid regions of the dense grid by simply shifting the level set threshold value.

The step (S100) of modeling multiphase materials may comprise steps of:

describing liquid and gas with a set of nonlinear partial differential equations that describe the complex-phase interface dynamics;

representing the liquid-gas interface as an implicit surface; and determining properties of the materials, from the information about the liquid-gas interface, including tracking the liquid surfaces.

The set of nonlinear partial differential equations may comprise an incompressible Euler equation given by a momentum conservation equation for inviscid incompressible free-surface flow $$u_t + (u \cdot \nabla)u + \nabla p = f,$$

and a mass conservation equation $$\nabla \cdot u = 0,$$

and u denotes the velocity field of the fluid, p pressure, and f represents the external forces including gravity and vorticity confinement force.

The step of representing the liquid-gas interface may comprise a level set method.

The level set method may comprise a level set equation, $\phi$, an implicit signed distance function such that $|\nabla\phi|=1$ for all domains.

The surface of liquid may be obtained by tracking the locations for $\phi=0$.

The liquid may evolve dynamically in space and time according to the underlying fluid velocity field, u, and the level set function may change according to the dynamical evolution of liquid and is updated by the level set equation, $\phi_t + u \cdot \nabla\phi = 0$.

The method may further comprise the step of solving the incompressible Euler equations and the level set equation at each time step.

The step of solving the incompressible Euler equations and the level set equation may comprise steps of:

advecting the level set according to the level set equation;

updating the velocity by solving the incompressible Euler equations; and simulating stretching and wiggling liquids, wherein the level set function $\phi$ and the fluid velocity field u are updated.

The step of updating the velocity may comprise a step of solving the momentum conservation equation and the mass conservation equation using a fractional step method, in which a Poisson equation is solved under divergence-free conditions to obtain a pressure, which is then used to project the intermediate velocity field into a divergence-free field.

The step of solving the incompressible Euler equations and the level set equation may comprise steps of:

using a free-surface model in which atmospheric pressure is assumed to be constant, $p|_{\phi>0} = p_{atm}$ as a Dirichlet condition boundary condition at the liquid-air interface; and using a ghost fluid method for solving free-surface flow, and the free-surface flow model does not simulate a fluid flow of air and a velocity at the interface is extrapolated to the air region along a direction normal to a liquid surface.

The Eulerian vortex sheet method may assume that vorticity $\omega = \nabla \times u$ is concentrated at the liquid—air interface, wherein the phase interface itself constitutes a vortex sheet with varying vortex sheet strength, wherein for the three-dimensional case, vortex sheet strength $\eta$ is approximated at a interface $\Gamma$ by $$\eta = n \times (u^+ - u^-)|_\Gamma,$$

where $u^{\pm}$ is the velocity at $\phi^{\pm}$, wherein $\eta$ is a three-dimensional vector quantity, implying that the vortex sheet strength is a jump condition for the tangential component of the velocity across the interface.

Combining the vortex sheet strength equation with the Euler equations, the transport of the vortex sheet may be expressed as $$\eta_t + u \cdot \nabla \eta = -n \times \{(\eta \times n) \cdot \nabla u\} + n\{(\nabla u \cdot n) \cdot \eta\} + S.$$

The left-hand side of the transport equation may be related to the advection of the vortex sheet strength $\eta$, and the terms in the right-hand side represent the effects of stretching, dilatation, and extra sources, and the transport equation may be valid only at the interface since $\eta$ is defined on the surface, and in the vicinity of the surface, $\eta$ is extrapolated along the surface normal direction using $\nabla \eta \cdot \nabla \phi = 0$, an Eikonal equation.

A source term S may comprise surface tension and baroclinity terms, and the baroclinity term accounts for interfacial effects including the Rayleigh-Taylor instability, which arise due to the density difference between liquid and air.

The source term may be $S = bAn \times (a-g)$, where b is a parameter used to control the magnitude of this effect.

Solving the transport equation may give the vortex sheet strength $\eta$ over the liquid surface.

The vorticity $\omega$ may be calculated from $\eta$ with $$\omega(x) = \int_\Gamma \eta(s) \delta(x - x(s)) ds.$$

The vorticity equation may be rewritten as a volume integral $$\omega(x) = \int_V \eta(x') \delta(x - x') \delta(\phi(x')) |\nabla \phi(x')| dx',$$

and the velocity is calculated from the vorticity $\omega$ using the stream function $\nabla^2 \psi = \omega$, and then compute $u = \nabla \times \psi$.

With the computed vorticity, the vorticity confinement may be applied to the velocity field, wherein letting $N = \nabla|\omega|/|\nabla|\omega||$, the vorticity confinement force can be written as $$f_v(x) = \alpha h(N \times \omega),$$

where h is the size of the grid cell, and $\alpha$ is the control parameter for the vorticity confinement force.

A single time step may be simulated by augmenting the external force term of vorticity confinement force equation with the confinement force, and a semi-Lagrangian scheme may be used for the advection term in the transport equation, and other terms may be discretized with second-order central difference, and first-order Euler integration is used for time-marching, and in implementing the vorticity confinement, the interface-concentrated vorticity $\omega$ of the volume integral equation may be blended using a truncated Gaussian kernel with a kernel width of 10h.

In order to generate turbulence effects, $\eta$ in the volume integral equation may be replaced with $\hat{\eta} = \eta(1 + T\Phi)$, where T is the projection operator and $\Phi$ is the ambient vector noise, which is generated using the Perlin noise algorithm, and operator T projects this noise to the tangential plane of the surface, since vortex sheet strength should be orthogonal to the surface normal.

The method may further comprise a step of using a plruality of control variables comprising b, $\alpha$, and $\Phi$, in order to control the extent of liquid-air interaction, the strength of the vortices, and the ambient noise, respectively.

The liquid-biased filtering may be configured not to miss liquid regions in a process of downsampling, making the liquid regions of the coarse grid enclose all the liquid regions of the dense grid by simply shifting the level set threshold value.

While the invention has been shown and described with reference to different embodiments thereof, it will be appreciated by those skilled in the art that variations in form, detail, compositions and operation may be made without departing from the spirit and scope of the invention as defined by the accompanying claims.

REFERENCES

[1] Adam W. Bargteil and Tolga G. Goktekin and James F. O'brien and John A. Strain. A semi-Lagrangian contouring method for fluid simulation. *ACM Trans. Graph.*, 25(1): 19-38, 2006.

[2] Nuttapong Chentanez and Bryan E. Feldman and François Labelle and James F. O'Brien and Jonathan R. Shewchuk. Liquid simulation on lattice-based tetrahedral meshes. *SCA '07: Proceedings of the 2007 ACM SIGGRAPH/Eurographics symposium on Computer animation*, pages 219-228, 2007.

[3] Doug Enright and Duo Nguyen and Frederic Gibou and Ronald Fedkiw. Using the particle level set method and a second order accurate pressure boundary condition for free surface flows. *In Proc. 4th ASME-JSME Joint Fluids Eng. Conf., number FEDSM2003-45144. ASME*, pages 1-6, 2003.

[4] Douglas Enright and Stephen Marschner and Ronald Fedkiw. Animation and Rendering of Complex Water Surfaces. *ACM Trans. Graph.*, 21(3):736-744, 2002.

[5] Ronald Fedkiw and Jos Stam and Henrik Wann Jensen. Visual simulation of smoke. *Computer Graphics (Proc. ACM SIGGRAPH 2001)*, 35:15-22, 2001.

[6] Nick Foster and Ronald Fedkiw. Practical Animation of Liquids. *Computer Graphics (Proc. ACM SIGGRAPH 2001)*, 35:23-30, 2001.

[7] Frederic Gibou and Ronald P. Fedkiw and Li-Tien Cheng and Myungjoo Kang. A second-order-accurate symmetric discretization of the Poisson equation on irregular domains. *J. Comp. Phys.*, 176(1):205-227, 2002.

[8] M. Herrmann. Modeling primary breakup: A three-dimensional Eulerian level set/vortex sheet method for two-phase interface dynamics. *Annual Research Briefs, Center for Turbulence Research*, 2003.

[9] Jeong-Mo Hong and Chang-Hun Kim. Discontinuous fluids. *ACM Trans. Graph.*, 24(3):915-920, 2005.

[10] Ben Houston and Michael B. Nielsen and Christopher Batty and Ola Nilsson and Ken Museth. Hierarchical RLE level set: A compact and versatile deformable surface representation. *ACM Trans. Graph.*, 25(1):151-175, 2006.

[11] ByungMoon Kim and Yingjie Liu and Ignacio Llamas and Jarek Rossignac. Advections with Significantly Reduced Dissipation and Diffusion. *IEEE Transactions on Visualization and Computer Graphics*, 13(1):135-144, 2007.

[12] Doyub Kim and Oh-Young Song and Hyeong-Seok Ko. A Semi-Lagrangian CIP Fluid Solver without Dimensional Splitting. *Computer Graphics Forum*, 27(2):467-475, 2008.

[13] Theodore Kim and Nils Thürey and Doug James and Markus Gross. Wavelet turbulence for fluid simulation. *ACM Trans. Graph.*, 27(3):50, 2008.

[14] Frank Losasso and Fréderic Gibou and Ronald Fedkiw. Simulating Water and Smoke with an Octree Data Structure. *ACM Trans. Graph.*, 23(3):457-462, 2004.

[15] Frank Losasso and Tamar Shinar and Andrew Selle and Ronald Fedkiw. Multiple interacting liquids. *ACM Trans. Graph.*, 25(3):812-819, 2006.

[16] Frank Losasso and Jerry Talton and Nipun Kwatra and Ronald Fedkiw. Two-Way Coupled SPH and Particle Level Set Fluid Simulation. *IEEE Transactions on Visualization and Computer Graphics*, 14(4):797-804, 2008.

[17] Stephen R. Marschner and Richard J. Lobb. An Evaluation of Reconstruction Filters for Volume Rendering. *Proceedings of Visualization '94*, pages 100-107, 1994.

[18] Viorel Mihalef and Dimitris Metaxas and Mark Sussman. Textured Liquids based on the Marker Level Set. *Comput. Graph. Forum*, 26(3):457-466, 2007.

[19] Matthias Müller and David Charypar and Markus Gross. Particle-based fluid simulation for interactive applications. *Proceedings of the 2003 ACM SIGGRAPH/Eurographics symposium on Computer animation*, pages 154-159, 2003.

[20] Rahul Narain and Jason Sewall and Mark Carlson and Ming C. Lin. Fast animation of turbulence using energy transport and procedural synthesis. *ACM Trans. Graph.*, 27(5):166, 2008.

[21] Ken Perlin. An image synthesizer. *SIGGRAPH Comput. Graph.*, 19(3):287-296, 1985.

[22] Simon Premože and Tolga Tasdizen and James Bigler and Aaron Lefohn and Ross T. Whitaker. Particle-Based Simulation of Fluids. *Computer Graphics Forum*, 22(3): 401-410, 2003.

[23] Hagit Schechter and Robert Bridson. Evolving Sub-Grid Turbulence for Smoke Animation. *Proceedings of the 2008 ACM/Eurographics Symposium on Computer Animation*, 2008.

[24] Andrew Selle and Ronald Fedkiw and ByungMoon Kim and Yingjie Liu and Jarek Rossignac. An Unconditionally Stable MacCormack Method. *J. Sci. Comput.*, 35(2-3): 350-371, 2008.

[25] Andrew Selle and Nick Rasmussen and Ronald Fedkiw. A vortex particle method for smoke, water and explosions. *ACM Trans. Graph.*, 24(3):910-914, 2005.

[26] J. A. Sethian. *Level Set Methods and Fast Marching Methods*. Cambridge University Press, 1999.

[27] Oh-Young Song and Doyub Kim and Hyeong-Seok Ko. Derivative Particles for Simulating Detailed Movements of Fluids. *IEEE Transactions on Visualization and Computer Graphics*, 13(4):711-719, 2007.

[28] Oh-Young Song and Hyuncheol Shin and Hyeong-Seok Ko. Stable but Non-Dissipative Water. *ACM Trans. Graph.*, 24(1):81-97, 2005.

[29] Jos Stam. Stable fluids. *Computer Graphics (Proc. ACM SIGGRAPH '99)*, 33(Annual Conference Series):121-128, 1999.

[30] Grétar Tryggvason. Numerical simulations of the Rayleigh-Taylor instability. *J. Comp. Phys.*, 75(2):253-282, 1988.

[31] Chris Wojtan and Greg Turk. Fast viscoelastic behavior with thin features. *ACM Trans. Graph.*, 27(3):47, 2008.

What is claimed is:

1. A method or graphically simulating stretching and wiggling liquids using one or more computer devices, the method comprising steps for:
   modeling multiphase materials with a grid of nodes for dealing with multiphase behaviors including complex phase-interface dynamics; and
   simulating stretching and wiggling liquids using a Eulerian vortex sheet method, which focuses on vorticity at a liquid-gas interface and provides a user control for producing visual effects and employing a dense (high-resolution) grid for surface tracking in addition to a coarse (low-resolution) simulation grid, which downsamples a surface in the high-resolution grid into the low-resolution grid without a volume loss resulting from aliasing error,
   wherein employing the dense grid for surface tracking is performed by a liquid-biased filtering, in which liquid regions of the coarse grid enclose all liquid regions of the dense grid by simply shifting the level set threshold value.

2. The method of claim 1, wherein the step of modeling multiphase materials comprises steps of:
   describing liquid and gas with a sot of nonlinear partial differential equations that describe the complex-phase interface dynamics;
   representing the liquid-gas interface as an implicit surface; and
   determining properties of the materials, from the information about the liquid-gas interface, including tracking the liquid surfaces.

3. The method of claim 2, wherein the set of nonlinear partial differential equations comprises an incompressible Euler equation given by a momentum conservation equation for inviscid incompressible free-surface flow $$u_t + (u \cdot \nabla)u + \nabla p = f,$$

and a mass conservation equation $$\nabla \cdot u = 0,$$

wherein u denotes the velocity field of the fluid, p pressure, and f represents the external forces including gravity and vorticity confinement force.

4. The method of claim 2, wherein the step of representing the liquid-gas interface comprises a level set method.

5. The method of claim 4, wherein the level set method comprises a level set equation, $\phi$, an implicit signed distance function such that $|\nabla \phi| = 1$ for all domains.

6. The method of claim 5, wherein the liquid surface are obtained by tracking the locations for $\phi = 0$.

7. The method of claim 3, wherein the liquid evolves dynamically in space and time according to the underlying fluid velocity field, u, wherein the level set function changes according to the dynamical evolution of liquid and is updated by the level set equation, $$\phi_t + u \cdot \nabla \phi = 0.$$

8. The method of claim 7, further comprising the step of solving the incompressible Euler equation and the level set equation at each time step.

9. The method of claim 8, wherein the step of solving the incompressible Euler equation and the level set equation comprises steps of:
   advectinq the level set according to the level set equation;
   updating the velocity by solving the incompressible Euler equations; and
   simulating stretching and wiggling liquids,
   wherein the level set function $\phi$ and the fluid velocity field u are updated.

10. The method of claim 9, wherein the step of updating the velocity comprises a step of solving the momentum conservation equation and the mass conservation equation using a fractional step method, in which a Poisson equation is solved under divergence-free conditions to obtain a pressure, which is then used to project the intermediate velocity field into a divergence-free field.

11. The method of claim 9, wherein the step of solving the incompressible Euler equation and the level set equation comprises steps of:
   using a free-surface model in which atmospheric pressure is assumed to be constant, $p|_{\phi>0}=p_{atm}$ as a Dirichlet condition boundary condition at a liquid-air interface; and
   using a ghost fluid method for solving free-surface flow, wherein the free-surface flow model does not simulate a fluid flow of air and a velocity at the interface is extrapolated to the air region along direction normal to a liquid surface.

12. The method of claim 11, wherein the Eulerian vortex sheet method assumes that vorticity $\omega=\nabla\times u$ is concentrated at the liquid-air interface, wherein the phase interface itself constitutes a vortex sheet with varying vortex sheet strength, wherein for the three-dimensional case, vortex sheet strength η is approximated at a interface Γ by $$\eta = n\times(u^+ - u^-)|_\Gamma,$$

where $u^\pm$ is the velocity at $\phi^\pm$, wherein η is a three-dimensional vector quantity, implying that the vortex sheet strength is a jump condition for the tangential component of the velocity across the interface.

13. The method of claim 12, wherein combining the vortex sheet strength equation with the Euler equations, the transport of the vortex sheet expressed as $$\eta_t + u\cdot\nabla\eta = -n\times\{(\eta\times n)\cdot\nabla u\} + n\{(\nabla u\cdot n)\cdot\eta\} + S.$$

14. The method, of claim 13, wherein the left-hand side of the transport equation is related to the advection of the vortex sheet strength η, and the terms in the right-hand side represent the effects of stretching, dilatation, and extra sources, wherein the transport equation is valid only at the interface since η is defined on the surface, and wherein in the vicinity of the surface, η is extrapolated along the surface normal direction using $\nabla\eta\cdot\square\phi=0$, Eikonal equation.

15. The method of claim 14, wherein a source term S comprises surface tension and baroclinity terms, wherein the baroclinity term accounts for interfacial effects including the Rayleigh—Taylor instability, which arise due to the density difference between liquid and air.

16. The method of claim 15, wherein the source term is $S=bAn\times(a-g)$, where b is a parameter used to control the magnitude of this effect.

17. The method of claim 16, wherein solving the transport equation gives the vortex sheet strength η over the liquid surface.

18. The method of claim 17, wherein the vorticity ω is calculated from η with $$\omega(x) = \int_\Gamma \eta(s)\delta(x-x(s))\,ds.$$

19. The method of claim 18, wherein the vorticity equation is rewritten as a volume integral $$\omega(x) = \int_V \eta(x')\delta(x-x')\delta(\phi(x'))|\nabla\phi(x')|\,dx'.,$$

wherein the velocity is calculated, from the vorticity ω using a stream function $\nabla^2\psi=\omega$, and then compute $u=\nabla\times\psi$.

20. The method of claim 19, wherein with the computed vorticity, the vorticity confinement is applied to the velocity field, wherein letting $N=\nabla|\omega|/\|\nabla|\omega|\|$, the vorticity confinement force can be written as $$f_v(x)=\alpha h(N\times\omega),$$

where h is the size of the grid cell, and α is the control parameter for the vorticity confinement force.

21. The method of claim 20, wherein a single time step is simulated by augmenting the external force term of vorticity confinement force equation with the confinement force, wherein a semi-Lagrangian scheme is used for the advection term in the transport equation, wherein other terms are discretized with a second-order central difference of finite difference approximations, and first-order Euler integration is used for time-marching, and wherein in implementing the vorticity confinement, the interface-concentrated vorticity ω of the volume integral equation is blended using a truncated Gaussian kernel with a kernel width of 10h.

22. The method of claim 21, wherein in order to generate turbulence effects, η in the volume integral equation replaced with $\hat{\eta}=\eta(1+TF)$, where T is the projection operator and F is the ambient vector noise, which is generated using the Perlin noise algorithm, and operator T projects this noise to the tangential plane of the surface, since vortex sheet strength should be orthogonal to the surface normal.

23. The method of claim 22, further comprising a step of using a plruality of control variables comprising b, α, and F, in order to control the extent of liquid-air interaction, the strength of the vortices, and the ambient noise, respectively.

24. The method of claim 1, wherein the liquid-biased filtering is configured not to miss liquid regions in a process of downsampling, making the liquid regions of the coarse grid enclose all the liquid regions of the dense grid by simply shifting the level set threshold value.

* * * * *